Figure 1:
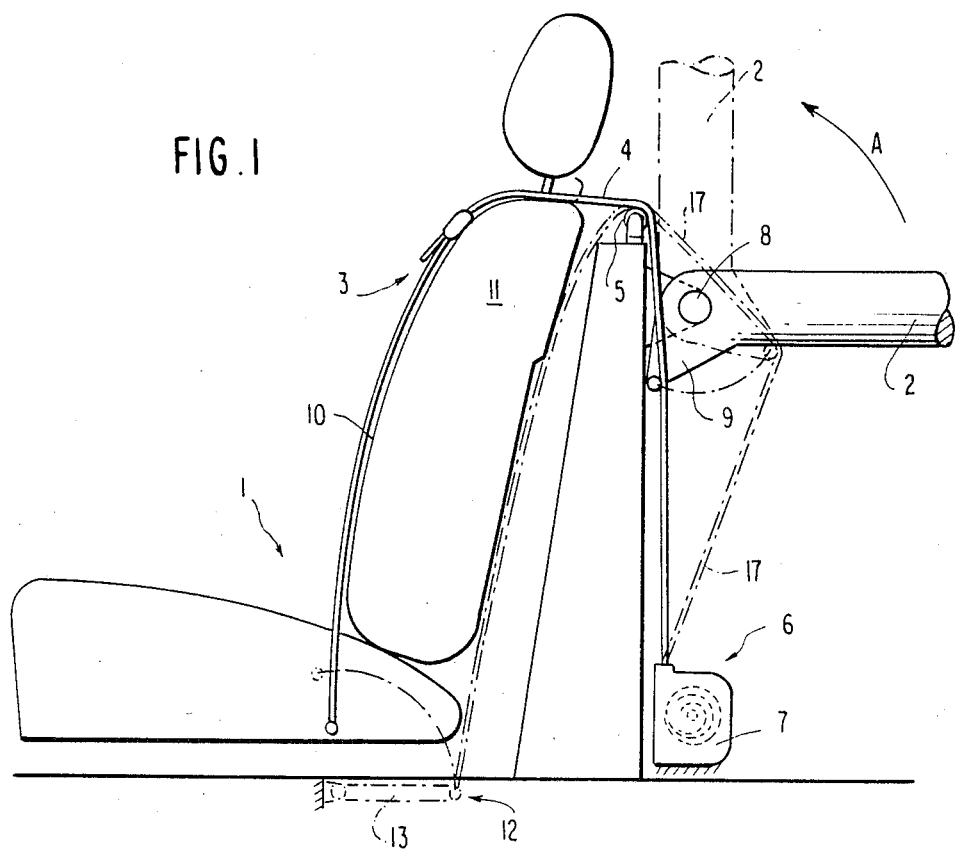

United States Patent [19]

Baumann et al.

[11] Patent Number: 4,592,571
[45] Date of Patent: Jun. 3, 1986

[54] ROLL BAR FOR A MOTOR VEHICLE

[75] Inventors: Karl-Heinz Baumann, Böblingen; Uli Mang, Weil im Schönbuch; Wolfgang Schwede, Sindelfingen, all of Fed. Rep. of Germany

[73] Assignee: Daimler-Benz Aktiengesellschaft, Fed. Rep. of Germany

[21] Appl. No.: 714,992

[22] Filed: Mar. 22, 1985

[30] Foreign Application Priority Data

Mar. 23, 1984 [DE] Fed. Rep. of Germany ....... 3410676

[51] Int. Cl.$^4$ ............................................. B60R 21/02
[52] U.S. Cl. ................................... 280/756; 280/749; 280/806; 280/808
[58] Field of Search ............... 280/749, 756, 801, 806, 280/808; 414/914; 296/109, 186

[56] References Cited

U.S. PATENT DOCUMENTS

| | | | |
|---|---|---|---|
| 1,291,496 | 1/1919 | Hardie | 280/756 |
| 2,740,642 | 4/1956 | Atwood | 280/749 |
| 3,522,918 | 8/1970 | Wrighton | 280/806 |
| 4,213,652 | 7/1980 | Irwin et al. | 280/806 |
| 4,557,502 | 12/1985 | Scaduto et al. | 280/756 |

FOREIGN PATENT DOCUMENTS 3127525 1/1983 Fed. Rep. of Germany ...... 280/756

Primary Examiner—John J. Love
Assistant Examiner—Kenneth R. Rice
Attorney, Agent, or Firm—Craig and Burns

[57] ABSTRACT

To prevent the possibility of the upper extremities of a strapped-in passenger in a convertible vehicle from going beyond the extension of the tiltable roll bar in the event that the vehicle turns over, despite the fact that the roll bar is erected, the latter is extended beyond its particular pivoting point, and this extension engages around the shoulder-belt part between its deflection point and the lower fastening point, and when the roll bar is swung up, causes a tautening of the belt-band run because the shoulder-belt part is taken up.

10 Claims, 2 Drawing Figures

U.S. Patent

Jun. 3, 1986

4,592,571

ROLL BAR FOR A MOTOR VEHICLE

The invention relates to a roll bar for a motor vehicle of convertible design, the roll bar being transferred in the event of danger from a rear storage position into a preferably vertical operative position by means of a tilting action, and the motor vehicle being provided with safety belts assigned to the front seats, each shoulder-belt part, deflected at an upper point, being guided to a lower fastening point.

A bar which can be swung up in this way and which forms part of a canopy framework is known from German Patent Specification No. 2,630,058. On convertible vehicles customary at the present time, which are equipped with safety belts assigned to the front seats, if the vehicle overturns there is the danger that, as a result of a lateral pendulum movement of the strapped-in occupant, the latter will rotate completely out of the shoulder belt and his head will consequently assume a height located above the erected roll bar, with the result that its protective effect will be severely restricted.

An object of the invention is, by simple and automatically acting means, effectively to prevent the possibility of the head of the strapped-in passenger going beyond the range of protection of the erected roll bar in the event that the vehicle overturns.

In accordance with the invention, the roll bar of a convertible is rotated about a pivoting point and an extension of the roll bar engages the shoulder-belt part of a safety belt between a deflection point of the safety belt and the fastening point of the fastening belt, the extension representing a lever which, when the roll bar is swung up, takes up the belt band, round which it is engaged, and guides it to the rear. As a result, the safety belt is pulled against the body of the particular occupant with a prestress preventing any injuries and holds the occupant firmly in his seat.

If the motor vehicle is provided with a belt-reeling mechanism located in the region of the fastening point and if the co-driver's seat is unoccupied, then, in spite of the blocking effect of the later which occurs, tightening of the belt is possible and consequently the roll bar can be swung up unimpeded, when, in the storage position, the shoulderbelt part is guided over the front side of the back-rest. When the belt band is thereby tightened, it digs into the upholstery of the backrest. However, provided that the overall conditions remain the same, it is also possible to guide the shoulder-belt part past next to the backrest on the same side as the door and support the associated free end via a pivotably arranged lever so as to be fixed to the vehicle. When the belt band is tightened under these preconditions, the lever can pivot about its fulcrum located on the vehicle.

Further design possibilities, according to the invention, reduce the risk of injury by providing padding for the roll bar and further by the provision of a guard device opened together with the transfer of the roll bar into its operative position wherein the guard device is designed as a net.

Figure 2:
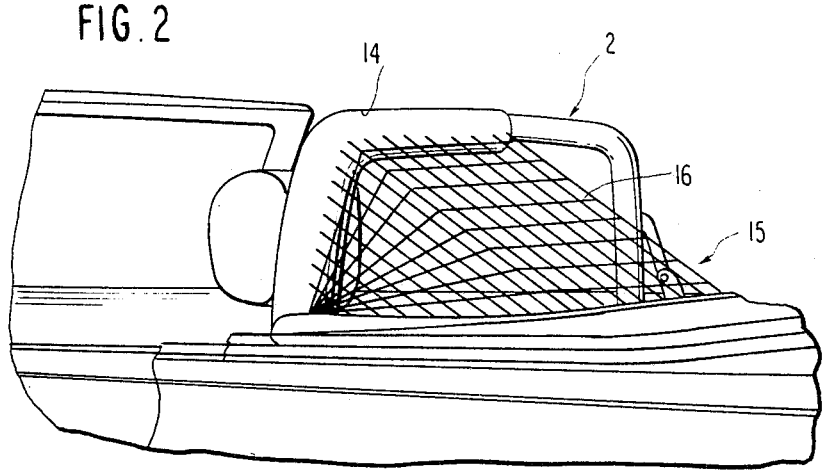

These and other objects, features, and advantages of the present invention will become more apparent from the following description when taken in connection with the accompanying drawings which show, for purposes of illustration only, one embodiment in accordance with the present invention and wherein:

FIG. 1 shows a diagramatic representation of a roll bar assigned to a front seat, and FIG. 2 shows an erected, padded roll bar partially provided with a guard device.

Referring now to the drawings wherein like reference numerals are used to designate like parts, and more particularly, to FIG. 1, there is assigned to a front seat 1 of a convertible vehicle, not shown in any more detail, a pivotably arranged roll bar 2 which, in its storage position indicated by unbroken lines, rests in a way not shown on the top side of the backrest of a spare rear seat. The front seat 1 is equipped with a safety belt 3, the shoulder-belt part 4 of which is guided via a deflection point 5 to a lower fastening point 6 receiving a belt-reeling mechanism 7.

The roll bar 2 has an extension 9 beyond its pivoting point 8 fixed to the vehicle, and the extension 9 provided in this way engages around the shoulder-belt 4 between its deflection point 5 and the belt-reeling mechanism 7, so that, in the event of a movement of the roll bar 2 taking place in the direction of the arrow A and triggered, for example, by a pyrotechnic device (not shown) in conjunction with a sensor responding to rotational acceleration or to angles of rotation, the shoulder-belt 4 is taken up with it, as indicated by broken lines at 17. The safety belt 3 is consequently tightened, and this prevents the upper extremities of a strapped-in occupant from going beyond the outlines of the vertically erected roll bar 2 and thus prevents the occupant from suffering injury.

Since the belt-reeling mechanism 7 is equipped with a blocking device (not shown) which is intended for the shoulder-belt 4 and which has already responded when the roll bar 2 was swung up, it is also necessary, for an unimpeded cycle of movement, to provide for the possibility of belt tightening when the driver's side seat is unoccupied. This can be achieved when, as shown by an unbroken line, the shoulder-belt 4 is deliberately guided over the front side 10 of the associated backrest 11. When the roll bar 2 is swung up, the shoulder-belt part 4 is pulled into the upholstery of the backrest 11.

However, it is also possible to guide the shoulder-belt part 4 past and adjacent to the backrest 11 on the same side as the door and to fasten the associated free end 12 to a lever 13 mounted so as to be pivotable and fixed to the vehicle, as represented by dot-and-dash lines. When the belt band is tightened, with the front seat 1 unoccupied, the lever 13 swings upwards, as indicated.

In FIG. 2, the roll bar 2 is erected and is provided with only partially illustrated padding 14 and a guard device 15 in extended configuration in the form of a net 16, the latter preventing passengers or luggage placed on the spare seats from being thrown out or thrown towards the front occupants.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A roll bar operated safety belt assembly for a convertible motor vehicle with a front seat having a back rest comprising at least one front seat safety belt means comprising a seat belt, means fastening each end of the seat belt to the vehicle body at two points between which the seat belt under tension passes over the front seat, a roll bar, pivot means mounting the roll bar to the vehicle for rotation between a rear storage position and a vertical operative position, and an extension means engaging the seat belt and responsive to rotation of the roll bar from its storage position to its operative position to increase tension in the seat belt to prevent any portion of an occupant from extending beyond the roll bar in its operative position.

2. A roll bar operated safety belt assembly according to claim 1, wherein the seat belt comprises a shoulder portion guided over the backrest and the assembly further comprises a belt reeling means for controlling tension of the seat belt.

3. A roll bar operated safety belt assembly according to claim 1 wherein the motor vehicle has a door on one side thereof, further comprising a belt reeling means proximate a first of said ends of the seat belt, the seat belt has a shoulder-belt part adjacent the backrest, and a pivotable lever means engaging the seat belt at the second end of the seat belt and mounted to the vehicle responsive to tightening of the seat belt to rotate for maintaining seat belt tension.

4. A roll bar control safety belt assembly in accordance with claim 1, further comprising padding means provided on the roll bar.

5. A roll bar control safety belt assembly in accordance with claim 2, further comprising padding means provided on the roll bar.

6. A roll bar control safety belt assembly in accordance with claim 3, further comprising padding means provided on the roll bar.

7. A roll bar control safety belt assembly in accordance with claim 1, further comprising a guard means assuming an extended configuration in response to rotation of the roll bar from its storage position to its operative position, the guard means comprising at least a net.

8. A roll bar control safety belt assembly in accordance with claim 2, further comprising a guard means assuming an extended configuration in response to rotation of the roll bar from its storage position to its operative position, the guard means comprising at least a net.

9. A roll bar control safety belt assembly in accordance with claim 3, further comprising a guard means assuming an extended configuration in response to rotation of the roll bar from its storage position to its operative position, the guard means comprising at least a net.

10. A roll bar control safety belt assembly in accordance with claim 4, further comprising a guard means assuming an extended configuration in response to rotation of the roll bar from its storage position to its operative position, the guard means comprising at least a net.

* * * * *